(12) United States Patent
Takaoka et al.

(10) Patent No.: US 8,422,603 B2
(45) Date of Patent: Apr. 16, 2013

(54) SIGNAL RECEIVING APPARATUS, SIGNAL RECEIVING METHOD AND SIGNAL RECEIVING PROGRAM

(75) Inventors: Katsumi Takaoka, Chiba (JP); Doan Tien Dung, Kanagawa (JP)

(73) Assignee: Sony Corporation, Tokyo (JP)

( * ) Notice: Subject to any disclaimer, the term of this patent is extended or adjusted under 35 U.S.C. 154(b) by 1036 days.

(21) Appl. No.: 12/424,315

(22) Filed: Apr. 15, 2009

(65) Prior Publication Data

US 2009/0268855 A1 Oct. 29, 2009

(30) Foreign Application Priority Data

Apr. 23, 2008 (JP) ................................. 2008-112970

(51) Int. Cl.
*H03D 1/00* (2006.01)
*H04L 27/06* (2006.01)

(52) U.S. Cl.
USPC ........................... 375/343; 375/142; 375/150

(58) Field of Classification Search .................. 375/130, 375/142, 150, 343
See application file for complete search history.

(56) References Cited

U.S. PATENT DOCUMENTS

| 6,377,614 B1 * | 4/2002 | Yamashita | 375/149 |
| 7,085,252 B1 * | 8/2006 | Kuroiwa et al. | 370/335 |
| 2003/0012270 A1 * | 1/2003 | Zhou et al. | 375/150 |
| 2004/0190668 A1 * | 9/2004 | Paik et al. | 375/367 |
| 2005/0058220 A1 * | 3/2005 | Nagatani et al. | 375/296 |
| 2006/0251039 A1 * | 11/2006 | Maru | 370/342 |
| 2010/0002812 A1 * | 1/2010 | Steele et al. | 375/343 |
| 2010/0098137 A1 * | 4/2010 | Matsuyama et al. | 375/149 |

FOREIGN PATENT DOCUMENTS

| JP | 2003-218848 | 7/2003 |
| JP | 2004-343542 | 12/2004 |
| JP | 2005-039464 | 2/2005 |
| JP | 2005-333300 | 12/2005 |

* cited by examiner

*Primary Examiner* — Jean B Corrielus
(74) *Attorney, Agent, or Firm* — K&L Gates LLP

(57) ABSTRACT

A signal receiving apparatus for receiving signals is provided. The signal receiving apparatus includes a correlation-value computation section configured to sequentially compute a correlation value representing a correlation between the received signal and a series of known symbols while sliding the series of known symbols for every symbol included in the received signal, a maximum-value detection section configured to detect a largest correlation value among the correlation values computed by the correlation-value computation section for one frame of the received signal, and a correlation-value storage section configured to store each of the correlation values at one of a predetermined number of storage locations, before and after the largest correlation value is detected by the maximum-value detection section.

5 Claims, 13 Drawing Sheets

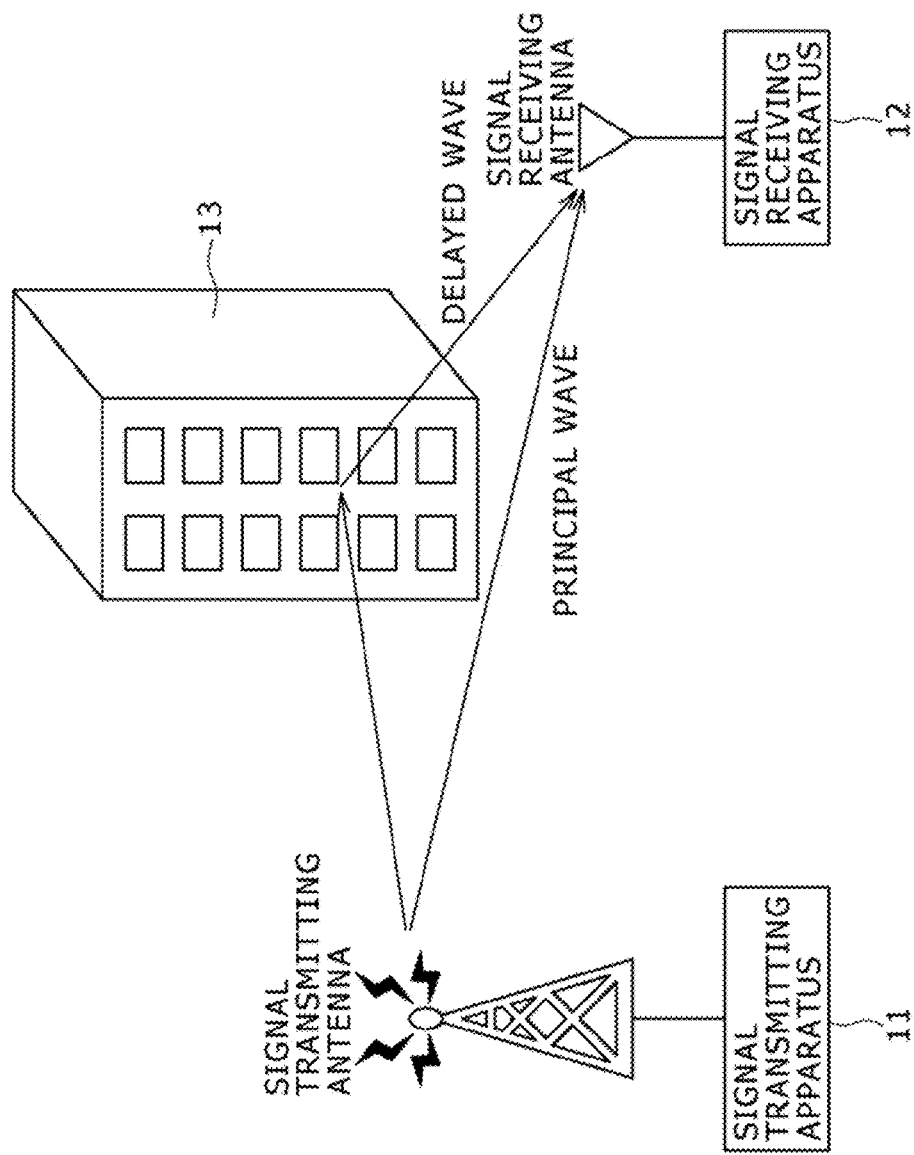

SIGNAL RECEIVING APPARATUS, SIGNAL RECEIVING METHOD AND SIGNAL RECEIVING PROGRAM

CROSS REFERENCES TO RELATED APPLICATIONS

The present application claims priority to Japanese Patent Application JP 2008-12970 filed in the Japan Patent Office on Apr. 23, 2008, the entire contents of which is incorporated herein by reference.

BACKGROUND

Generally, in a radio technology such as a technology underlying digital communications or a technology underlying digital broadcastings, a signal transmitted by a signal transmitting apparatus through a variety of transmission lines is received by a signal receiving apparatus. Typical examples of the signal transmitting apparatus are a broadcasting apparatus of a broadcasting station, a portable terminal and a relay station whereas typical examples of the signal receiving apparatus are a TV receiver, a portable terminal and a relay station. In a multipath environment in which a signal is transmitted by a signal transmitting apparatus through a variety of transmission lines to a signal receiving apparatus, the signal to be received by the signal receiving apparatus includes reflected waves and echos as described below.

For example, when a signal transmitted from a signal transmitting antenna connected to a signal transmitting apparatus 11 is received by a signal receiving antenna connected to a signal receiving apparatus 12, the signal receiving apparatus 12 actually receives a principal wave directly transmitted by the signal transmitting apparatus 11 and a wave reflected by the building 13 or the like to appear as a delayed wave delayed by a building 13.

Thus, a signal actually received by the signal receiving apparatus 12 is a compound wave including the principal wave and the delayed wave as described above. That is to say, a signal actually received by the signal receiving apparatus 12 is a distorted wave. Thus, the quality of a communication carried out in a multipath environment deteriorates. Therefore, in order to improve the quality of a communication carried out in a multipath environment, it is necessary to grasp characteristics of the multipath environment. Generally determined by the communication environment, the characteristics of the multipath environment include the transmission distance of each of a plurality of transmission lines composing the communication environment and the reflection characteristic of each of the transmission lines. In the following description, the characteristics of a multipath environment are properly referred to as a channel profile.

In a process of estimating a channel profile, a synchronization signal inserted into a data frame of a transmitted/received signal is used. The synchronization signal is a series of known symbols. The signal receiving apparatus 12 has also registered the series of known symbols in advance. In the following description, the symbol series inserted into a received signal is also referred to as the symbol series of the received signal whereas the symbol series registered in the signal receiving apparatus 12 in advance is also referred to as the symbol series of the synchronization signal. The signal receiving apparatus 12 computes the correlation value between the synchronization signal inserted into the principal wave of the received signal and the registered series of known symbols, estimating a channel profile by making use of the computation result which is referred to hereafter as correlation data.

As an example, FIG. 2 is given as a plurality of diagrams referred to in description of a typical channel profile estimated from a signal received by the signal receiving apparatus 12 in a multipath environment. The horizontal axis of the diagram of FIG. 2 represents the lapse of time t. In this case, the time t lapses in the left-to-right direction. Each of arrows erected in the upward direction represents the magnitude (or the level) of a correlation value.

As shown in the diagram of FIG. 2A, the signal received by the signal receiving apparatus 12 includes a principal wave and a post-echo. As shown in the diagram of FIG. 2B, on the other hand, the signal received by the signal receiving apparatus 12 includes a principal wave and a pre-echo.

By acquiring such a channel profile, the signal receiving apparatus 12 is capable of grasping the characteristics of a transmission line through which the signal received by the signal receiving apparatus 12 has been transmitted by the signal transmitting apparatus 11. For example, the signal receiving apparatus 12 is capable of grasping information used for determining whether or not the signal received by the signal receiving apparatus 12 has been transmitted by the signal transmitting apparatus 11 through a transmission line which generates a post-echo or a pre-echo. Thus, when carrying out a communication in a multipath environment, by performing equalization processing based on the channel profile of the multipath environment, it is possible to acquire the basic waveform from a distorted waveform. That is to say, the waveform of only the principal wave can be obtained. Thus, the quality of the communication can be improved.

Next, processing to estimate a channel profile is explained by referring to a diagram of FIG. 3.

For example, for every data frame having a frame length determined in advance, the signal transmitting apparatus 11 transmits a signal including a synchronization signal inserted into the head of the data frame to the signal receiving apparatus 12 in a multipath environment. In this case, the signal receiving apparatus 12 actually receives a compound signal including the principal wave of the original signal and a wave delayed due to effects of the multipath environment. The signal receiving apparatus 12 has registered the synchronization signal inserted into the signal received from the signal transmitting apparatus 11 as a series of known symbols in advance. The signal receiving apparatus 12 computes the correlation value representing a correlation between the synchronization signal inserted into a received signal and the registered series of known symbols from time to time while sliding the symbol series of the synchronization signal over the symbol series of the received signal.

In the case of a received signal including a principal wave and a delayed wave as described above, in a channel profile found on the basis of correlation data representing computed correlation values, a correlation value computed with a timing coincident with the synchronization-signal of the principal wave is the largest value and a correlation value computed with a timing coincident with the synchronization signal of the delayed wave is the second largest value. A correlation value computed with a timing other than the timing coincident with the synchronization signal of the principal wave and the timing coincident with the synchronization signal of the delayed wave is relatively small.

As shown in a diagram of FIG. 4, the signal receiving apparatus 12 compares the correlation value computed from time to time with a correlation threshold value th determined in advance and stores the correlation value in a memory.

Strictly speaking, if the correlation value is found equal to or greater than the correlation threshold value th for the first time, the signal receiving apparatus 12 starts an operation to store correlation values in a memory. The memory has N storage locations which are given addresses 0 to (N−1) respectively. The first correlation value found equal to or greater than the correlation threshold value th for the first time is stored at a storage location with an address of 0. In this case, the subsequent correlation values following the first correlation value are stored at the storage locations with addresses of 1 to (N−1).

If the received signal includes a post-echo for example, when the principal wave of the received signal is detected, the signal receiving apparatus 12 starts an operation to store correlation values in the memory shown at the bottom of the diagram of FIG. 4. The correlation value computed at the detection time of the principal wave is stored at an address of 0 in the memory as shown by a hatched block on the left end of the memory. Detection of the post-echo is delayed from the detection of the principal wave by a delay time. If the delay time is shorter than a period having a length corresponding to the N storage locations of the memory, the correlation value computed at the detection time of the post-echo is stored in the memory as shown by a hatched block in the middle of the memory. The computed correlation values stored in the memory having a size N storage locations as correlation values including the correlation value of the principal wave and the correlation value of the post-echo are referred to as correlation data from which a channel profile is estimated.

If the process of setting the correlation threshold value th to be compared with the computed correlation values is not carried out properly, however, a proper channel profile cannot be acquired, for example, from the correlation data including the correlation value of the principal wave and the correlation value of the post-echo as shown in the diagram of FIG. 4.

FIG. 5 is a diagram showing a typical case in which the correlation threshold value th is set at a level higher than a proper one. In this case, the correlation value of the principal wave is computed, being compared with the correlation threshold value th and an operation to store computed correlation values in the memory is started. Even if the received signal includes a pre-echo leading ahead of the principal wave, however, the computed correlation value of the pre-echo is not stored in the memory.

In order to allow the computed correlation value of the pre-echo to be detected and stored in the memory, on the other hand, the correlation threshold value th is set at a low level. FIG. 6 is a diagram showing a typical case in which the correlation threshold value th is set at a level lower than a proper one. In this case, the correlation value computed for a noise to appear as a correlation value higher than the correlation threshold value th is detected and an operation to store computed correlation values in the memory is started with an operation to store the correlation value computed for the noise. As shown in the diagram of FIG. 6, even though the computed correlation values of pre-echos and the principal wave can be stored in the memory, the computed correlation value of a post-echo cannot because the pre-echo is detected at a time beyond a period corresponding to the N storage locations which form the size of the memory.

In the typical cases described above by referring to the diagrams of FIGS. 5 and 6, it is impossible to obtain correlation data including the required correlation value of a post-echo or a pre-echo albeit including the correlation value of the principal wave. Thus, a proper channel profile cannot be estimated.

In addition, Japanese Patent Laid-open No. 2004-343542 describes a communication terminal in which an averaged-correlation-value profile is found by averaging the values of correlations between a received signal and a reference signal in order to detect a multipath in radio transmission lines.

As described above, a proper channel profile cannot be estimated from acquired correlation data in some cases.

SUMMARY

The present disclosure relates to a signal receiving apparatus, a signal receiving method adopted by the signal receiving apparatus and a signal receiving program implementing the signal receiving method. More particularly, the present application relates to a signal receiving apparatus capable of acquiring a proper channel profile, a signal receiving method adopted by the signal receiving apparatus and a signal receiving program implementing the signal receiving method.

Addressing the problems described above, a signal receiving apparatus capable of acquiring a proper channel profile is described below.

According to an embodiment there is provided a signal receiving apparatus for receiving signals, the signal receiving apparatus including:

a correlation-value computation section configured to sequentially compute a correlation value representing a correlation between the received signal and a series of known symbols while sliding the series of known symbols for every symbol included in the received signal;

a maximum-value detection section configured to detect a largest correlation value among the correlation values computed by the correlation-value computation section for one frame of the received signal; and a correlation-value storage section configured to store each of the correlation values at one of storage locations, the number of which is determined in advance, before and after the largest correlation value is detected by the maximum-value detection section.

According to another embodiment there is provided a signal receiving method for receiving a signal, the signal receiving method including the steps of:

sequentially computing a correlation value representing a correlation between the received signal and a series of known symbols while sliding the series of known symbols for every symbol included in the received signal;

detecting a largest correlation value among the correlation values computed at the correlation-value computation step for one frame of the received signal; and storing each of the correlation values computed at the correlation-value computation step at one of storage locations, the number of which is determined in advance, before and after the largest correlation value is detected at the maximum-value detection step.

According to yet another embodiment there is provided a signal receiving program to be executed by a computer embedded in a signal receiving apparatus for receiving signals to carry out processing including the steps of:

computing a correlation value representing a correlation between the received signal and a series of known symbols while sliding the series of known symbols for every symbol included in the received signal;

detecting a largest correlation value among the correlation values computed in the correlation-value computation process for one frame of the received signal; and storing each of the correlation values computed in the correlation-value computation process at one of storage locations, the number of which is determined in advance, before and after the largest correlation value is detected in the maximum-value detection process.

In accordance with the embodiments, a process is carried out to sequentially compute a correlation value representing a correlation between a received signal and a series of known symbol while sliding the series of known symbols for every symbol included in the received signal. Then, a process is carried out to detect a largest correlation value among the correlation values computed for one frame of the received signal. Finally, a process is carried out to store correlation values, the number of which is determined in advance, as correlation values computed before and after the largest correlation value is detected.

In accordance with the embodiments, a proper channel profile can be acquired.

Additional features and advantages are described herein, and will be apparent from the following Detailed Description and the figures.

BRIEF DESCRIPTION OF THE FIGURES

FIG. 1 is an explanatory diagram showing a multipath environment;

DETAILED DESCRIPTION

Embodiments are explained in detail by referring to diagrams as follows.

Figure 7:
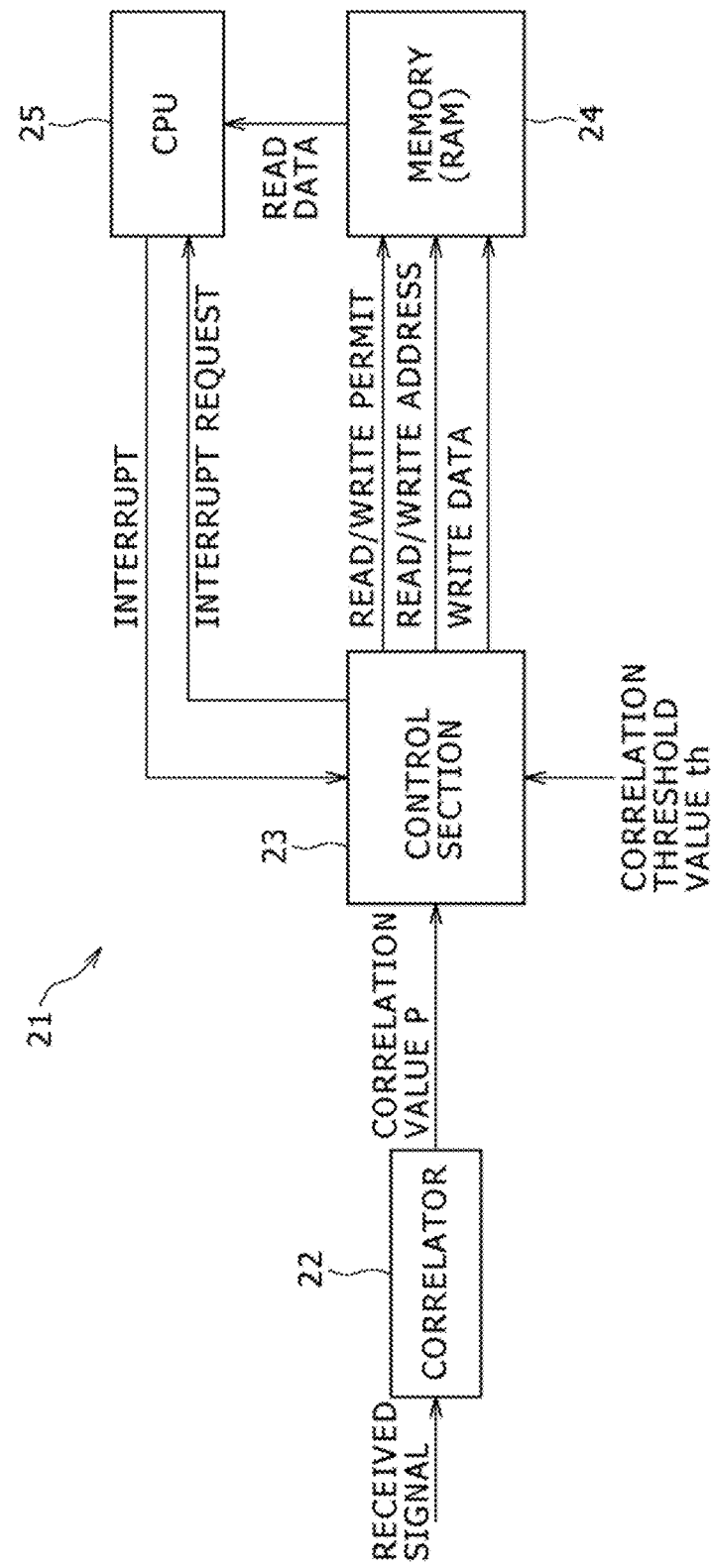
FIG. 7 is a block diagram showing a typical configuration of a signal receiving apparatus according to the embodiment.

FIG. 7 is a block diagram showing a typical configuration of a signal receiving apparatus 21 according to the embodiment.

The signal receiving apparatus 21 shown in the block diagram of FIG. 7 employs a correlation-value computation section 22, a control section 23, a RAM (Random Access Memory) 24, and a CPU (Central Processing Unit) 25.

The correlation-value computation section 22 receives a signal from a signal receiving circuit having an antenna. Both the signal receiving circuit and the antenna themselves are not shown in the block diagram of FIG. 7. When the correlation-value computation section 22 receives a signal from the signal receiving circuit, the correlation-value computation section 22 computes a correlation value P representing a correlation between a synchronization signal included in the received signal and a synchronization signal determined in advance and supplies the correlation value P to the control section 23. As the synchronization signal determined in advance, the correlation-value computation section 22 has a preregistered series of known symbols to be compared with a synchronization signal inserted into a signal received from a signal transmitting apparatus not shown in the diagram of FIG. 7. For each received signal, the correlation-value computation section 22 computes the correlation value P representing a correlation between the synchronization signal inserted into the received signal and the preregistered series of known symbols while sliding the series of known symbols over the received signal for every symbol included in the synchronization signal inserted into the received signal.

The control section 23 receives a correlation threshold value th as a part of initial setting. The correlation threshold value th serves as a boundary condition for typically excluding noises. The control section 23 receives a correlation value P from the correlation-value computation section 22 and stores the correlation value P in the memory 24 by adoption a ring-buffer storage method. The control section 23 also compares the correlation value P with the correlation threshold value th. The operation carried out by the correlation-value computation section 22 to compute a correlation value P and the operations carried out by the control section 23 to store the correlation value P in the memory 24 and compare the correlation value P with the correlation threshold value th are shown in threshold-value comparison processing represented by a flowchart shown in FIG. 11. If a correlation value P is found equal to or greater than the correlation threshold value th, the control section 23 starts correlation-data storage processing represented by a flowchart shown in FIG. 12 as processing to acquire and store remaining correlation data to be used for estimating a channel profile.

The control section 23 carries out the threshold-value comparison processing and the correlation-data storage processing for each frame of the received signal which is composed of a plurality of frames. Thus, the control section 23 carries out the threshold-value comparison processing and the correlation-data storage processing a plurality of times. Each time correlation data is acquired and stored in the memory 24, the CPU 25 reads out the correlation data from the memory 24.

The memory 24 has N storage locations. The control section 23 stores a correlation value P (Write data) received from the control section 23 at one of the N storage locations in the memory 24. In addition, in accordance with control executed by the control section 23, the CPU 25 reads out the correlation data (Read data) from the memory 24.

In accordance with an interrupt request received from the control section 23, the CPU 25 interrupts the control section 23 to read out correlation data from the memory 24 for every frame. Then, the CPU 25 computes an average of correlation values P each included in correlation data read out for one of a plurality of frames in order to estimate a channel profile.

Figure 8:
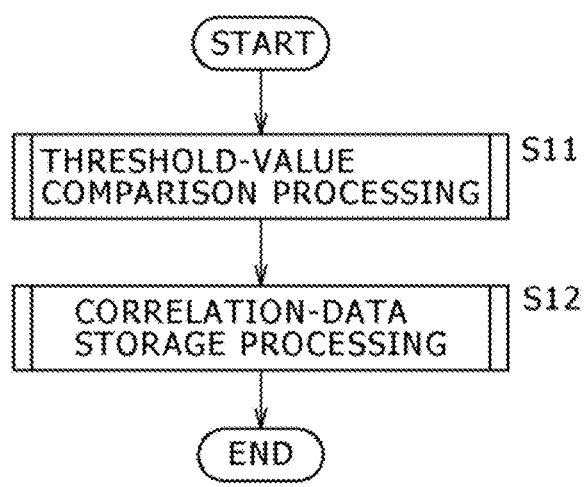
FIG. 8 shows a flowchart representing threshold-value comparison processing and correlation-data storage processing which are carried out by the signal receiving apparatus.

FIG. 8 shows a flowchart representing the threshold-value comparison processing and the correlation-data storage processing which are carried out by the signal receiving apparatus 21 shown in the block diagram of FIG. 7.

For example, the signal receiving apparatus 21 receives a signal from a signal transmitting apparatus shown in none of the diagrams of the figures and starts processing to decode the received signal. The processing represented by the flowchart shown in FIG. 8 begins with a step S11 at which the threshold-value comparison processing is carried out. In the threshold-value comparison processing, the correlation-value computation section 22 computes a correlation value P and supplies the correlation value P to the control section 23. The control section 23 receives the correlation value P from the correlation-value computation section 22 and stores the correlation value P in the memory 24 by adoption a ring-buffer storage method. The control section 23 compares the correlation value P with the correlation threshold value th. If the comparison result produced by the control section 23 in the threshold-value comparison processing indicates that the correlation value P is equal to or greater than the correlation threshold value th, the flow of the processing goes on from the step S11 to a step S12.

Figure 12:
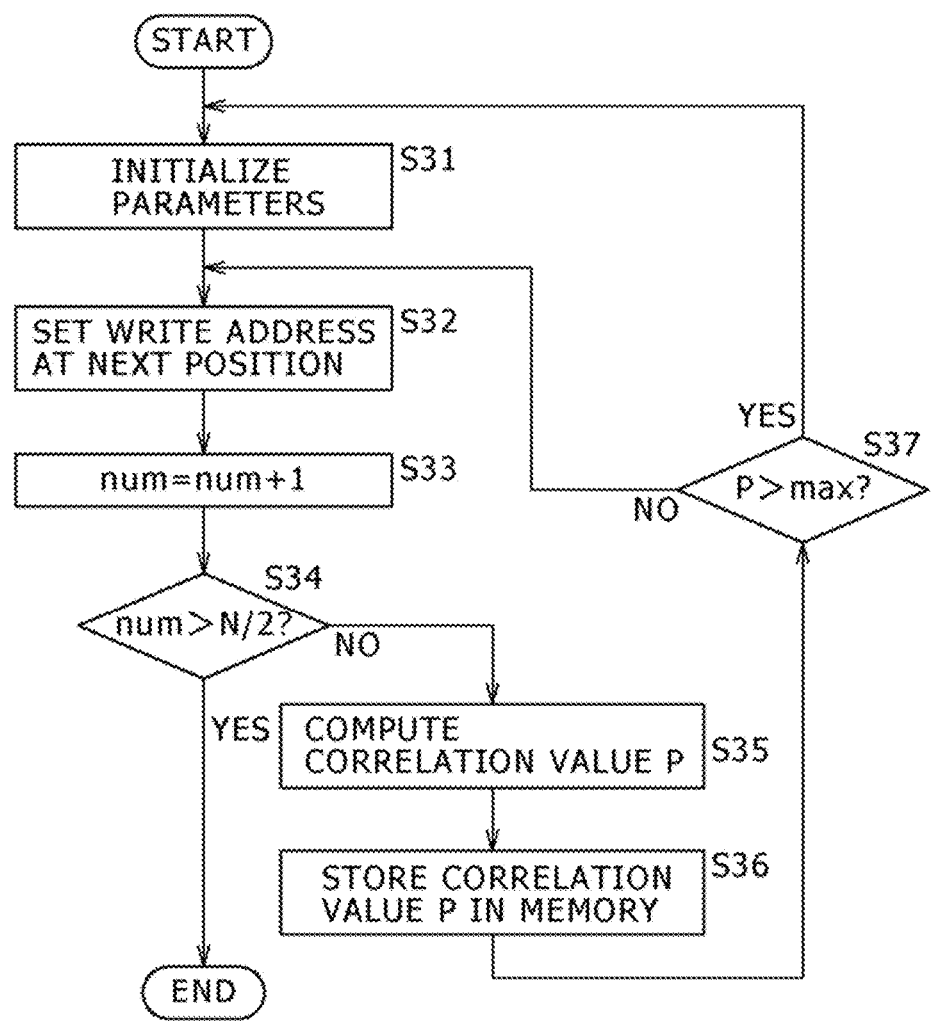
FIG. 12 shows a flowchart representing the correlation-data storage processing.

At the step S12, the control section 23 carries out the correlation-data storage processing in accordance with the flowchart shown in FIG. 12. In the correlation-data storage processing, the correlation data is stored in the memory 24 at remaining storage locations of the N storage locations typically centered at a storage location used for storing the correlation value P computed for the principal wave of the received signal. Then, the correlation-data storage processing is ended.

Figure 9:
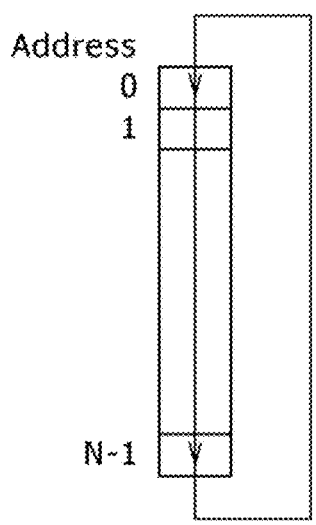
FIG. 9 is a diagram showing a storage image in a memory in threshold-value comparison processing.

FIG. 9 is a diagram referred to in description of the threshold-value comparison processing carried out at the step S11 of the flowchart shown in FIG. 8.

As shown in the diagram of FIG. 9, the memory 24 is composed of N storage locations given storage addresses Address_0 to Address_N−1 respectively. In the threshold-value comparison processing and the correlation-data storage processing, a correlation value P is stored in one of the N storage locations of the memory 24. Typically, the first correlation value P is stored at the head storage location given the first address Address_0. Thereafter, subsequent correlation values P are stored at following storage locations given storage addresses Address_1 to Address_N−1 respectively. As a correlation value P is stored at the tail storage location given the last address Address_N−1, the next correlation value P is stored again at the head storage location given the first address Address_0. This technique to store correlation values P is so-called ring-buffer storage method.

FIG. 10 is a plurality of diagrams each showing a storage image of the N storage locations in the memory 24 during the correlation-data storage processing carried out at the step S12 of the flowchart shown in FIG. 8.

Figure 10A:
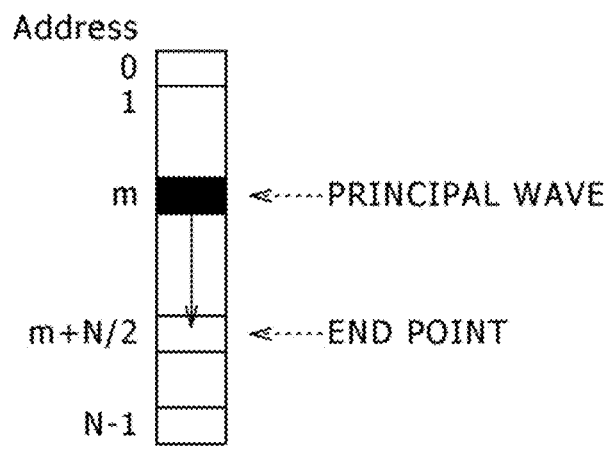
FIG. 10A is a diagram showing a storage image of the N storage locations of the memory in which the address Address_m used for storing the correlation value P of the principal wave is in the upper half of the N storage locations of the memory, that is, $m \leq N/2$.
Figure 10B:
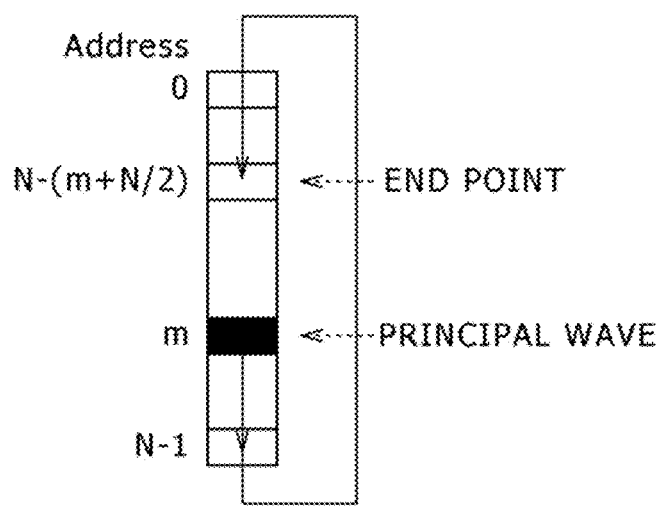
FIG. 10B is a diagram showing a storage image of the N storage locations of the memory in which the address Address_m used for storing the correlation value P of the principal wave is in the lower half of the N storage locations of the memory, that is, $m > N/2$.

To be more specific, FIG. 10A is a diagram showing a storage image of the N storage locations of the memory 24 in which the address Address_m used for storing, the correlation value P of the principal wave is in the upper half of the N storage locations of the memory 24, that is, m≦N/2. On the other hand, FIG. 10B is a diagram showing a storage image of the N storage locations of the memory 24 in which the address Address_m used for storing the correlation value P of the principal wave is in the lower half of the N storage locations of the memory 24, that is, m>N/2.

In the correlation-data storage processing, correlation values P computed after detection of the correlation value P of the principal wave are stored in a later half portion of the N storage locations in the memory 24. In the case of the typical example shown in the diagram of FIG. 10A, the later half portion of the N storage locations in the memory 24 ends at Address_m+N/2 whereas, in the case of the typical example shown in the diagram of FIG. 10B, the later half portion of the N storage locations in the memory 24 ends at Address_N−(m+N/2). The earlier half portion of the N storage locations in the memory 24 is used for storing correlation values P computed prior to the detection of the correlation value P of the principal wave.

That is to say, since the control section 23 stores the correlation value P in the memory 24 by adoption a ring-buffer storage method, at addresses lower than an address at which the correlation value P of the principal wave is stored, a correlation value P computed before the correlation value P of the principal wave is computed is stored. Thus, at the N storage locations, correlation values P composing the correlation data are stored with the correlation value P of the principal wave occupying about the center of the N storage locations.

Figure 11:
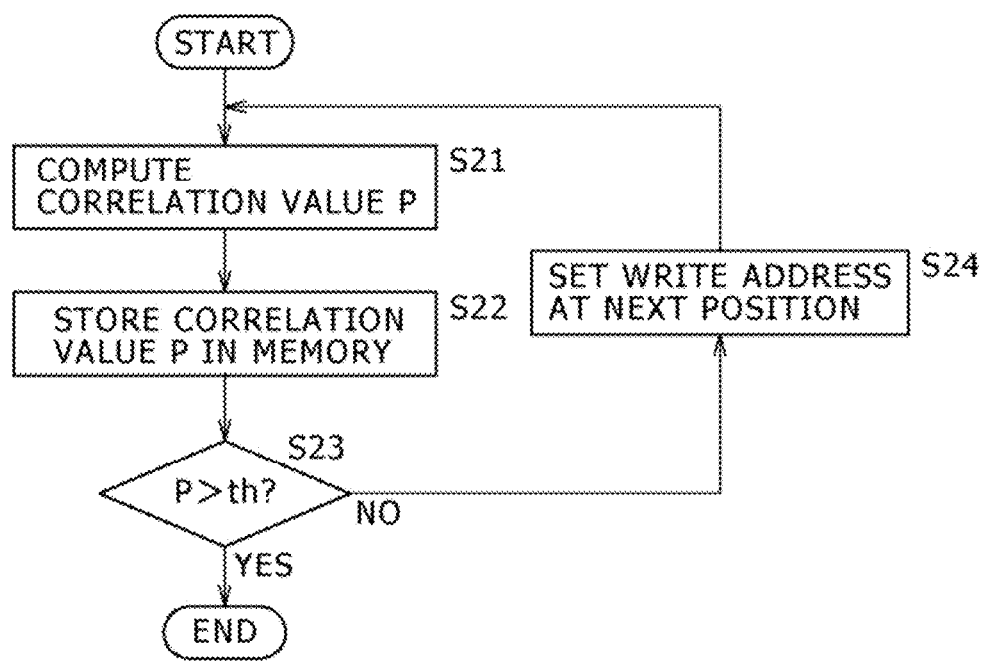
FIG. 11 shows a flowchart illustrating the threshold-value comparison processing.

Next, the threshold-value comparison processing carried out at the step S11 of the flowchart shown in FIG. 8 is explained by referring to the flowchart shown in FIG. 11.

The flowchart shown in FIG. 11 begins with a step S21 at which the correlation-value computation section 22 receives a signal from a signal receiving circuit having an antenna, not shown, and computes a correlation value P representing a correlation between a synchronization signal supplies the correlation value P to the control section 23. When the process of the step S21 is carried out for the first time by the correlation-value computation section 22, the head symbol series of the received signal supplied by the signal receiving circuit is taken as the subject of processing to compute a correlation value P. When the process of the step S21 is carried out, on the other hand, the symbol series of the received signal is sled by one symbol from the symbol series used in the computation of a correlation value P for the first time. When the process of the step S21 is carried out for the third time, the symbol series of the received signal is sled by one symbol from the symbol series used in the computation of a correlation value P for the second time, and so on. That is, when the process of the step S21 is carried out, a specific symbol series of the present received signal is used as the subject of processing to compute a correlation value P representing a correlation between the specific symbol series and the known symbol series of the synchronization signal. In this case, the specific symbol series of the received signal is obtained by sliding the symbol series used in the computation of a correlation value P of the received signal immediately preceding the present received signal by 1 symbol.

After the process of the step S21 has been completed, the flow of the threshold-value comparison processing goes on to a step S22 at which the control section 23 stores the correlation value P computed by the correlation-value computation section 22 at the step S21 at a predetermined address in the memory 24. When the process of the step S22 is carried out for the first time by the control section 23, the control section 23 stores the correlation value P at a head address, i.e., Address_0 in the memory 24. Then, the flow of the threshold-value comparison processing goes on to a step S23.

At the step S23, the control section 23 compares the correlation value P stored in the memory 24 at the step S22 with a correlation threshold value th in order to produce a result of determination as to whether or not the correlation value P is greater than the correlation threshold value th (i.e., P>th).

If the comparison result produced by the control section 23 at the step S23 indicates that the correlation value P stored in the memory 24 at the step S22 is not greater than the correlation threshold value th, the flow of the threshold-value comparison processing goes on to a step S24. At the step S24, the control section 23 increments the address, at which the correlation value P is to be stored in the memory 24 at the step S22, by 1. That is to say, the control section 23 makes use of the next address following the address already used for storing the correlation value P at the step S22 as an address to be used for storing the correlation value P in the next execution of the process of the step S22. Then, the flow of the threshold-value comparison processing goes back to the step S21 to repeat the processes of the steps S21, S22 and S23. As a result, correlation values P are stored in the memory 24 by adoption of the ring buffer technique explained earlier by referring to the diagram of FIG. 9.

If the comparison result produced by the control section 23 at the step S23 indicates that the correlation value P is greater than the correlation threshold value th, on the other hand, the threshold-value comparison processing is ended.

As described earlier by referring to the flowchart shown in FIG. 8, after the threshold-value comparison processing of the step S11 has been completed, the correlation-data storage processing is carried out at the step S12.

FIG. 12 shows a flowchart representing the correlation-data storage processing carried out at the step S12 of the flowchart shown in FIG. 8.

The flowchart shown in FIG. 8 begins with a step S31 at which the control section 23 initializes a variety of parameters. For example, the control section 23 sets the maximum correlation value max at the correlation value P determined to be greater than the correlation threshold value th at the step S23 of the flowchart shown in FIG. 11. The maximum correlation value max is a parameter representing the largest correlation value P among correlation values P obtained in this correlation-data storage processing. As another example, the control section 23 also sets a stored-data count num at 0. The stored-data count num is a parameter representing the number of correlation values P which are computed and stored in the memory 24 after the correlation value P determined to be equal to the maximum correlation value max has been stored in the memory 24. The correlation values P includes the correlation value P determined to be equal to the maximum correlation value max.

After the process of the step S31 has been completed, the flow of the correlation-data storage processing goes on to a step S32 at which the control section 23 increments the address, at which the correlation value P is to be stored in the memory 24 at a step S36 to be described later, by 1 to serve as the following address used for storing the next correlation value P. The address to be incremented by 1 by the control section 23 by carrying out the process at the step S32 is an address used last to store a correlation value P at the step S22 of the flowchart shown in FIG. 11 or an address used to store a correlation value P at the step S36 executed in an immediately preceding loop of the correlation-data storage processing. After the process of the step S32 has been completed, the flow of the correlation-data storage processing goes on to a step S33.

At the step S33, the control section 23 increments the stored-data count num by 1. After the process of the step S33 has been completed, the flow of the correlation-data storage processing goes on to a step S34.

At the step S34, the control section 23 produces a result of determination as to whether or not the stored-data count num incremented by 1 at the immediately preceding step S33 is greater than half the memory size set at N storage locations as the size of the memory 24 (that is, num>N/2). That is to say, the control section 23 produces a result of determination as to whether or not N/2 correlation values P have been stored in the memory 24 since the operation to store the correlation value P determined to be equal to the maximum correlation value max in the memory 24. Initially, the correlation value P determined to be equal to the maximum correlation value max in the memory 24 has been stored at the step S22 of the flowchart shown in FIG. 11. That is to say, the initial maximum correlation value max is the correlation value P which has been stored at the step S22 of the flowchart shown in FIG. 11.

If the determination result produced by the control section 23 at the step S34 indicates that the stored-data count num is not greater than half the memory size set at N storage locations as the size of the memory 24, that is, if the determination result produced by the control section 23 at the step S34 indicates that the number of correlation values P which have been stored in the memory 24 since the operation to store the correlation value P determined to be equal to the maximum correlation value max in the memory 24 is not greater than N/2, the flow of the correlation-data storage processing goes on to a step S35 at which the correlation-value computation section 22 computes the correlation value P representing a correlation between the symbol series in the received signal and the symbol series in the synchronization signal in the same way as the process carried out at the step S21 of the flowchart shown in FIG. 11 and supplies the correlation value P to the control section 23. In the same way as the process carried out at the step S21, the process of the step S21 is carried out by the correlation-value computation section 22 by making use of a specific symbol series of the present received signal as the subject of processing to compute a correlation value P representing a correlation between the specific symbol series and the symbol series of the synchronization signal. In this case, the specific symbol series of the received signal is obtained by sliding the symbol series used in the computation of a correlation value P of the received signal immediately preceding the present received signal by 1 symbol.

After the process of the step S35 has been completed, the flow of the correlation-data storage processing goes on to a step S36 at which, in the same way as the process carried out at the step S22 of the flowchart shown in FIG. 11, the control section 23 stores the correlation value P computed by the correlation-value computation section 22 at the step S35 at an address set at the step S32 as an address in the memory 24. After the process of the step S36 has been completed, the flow of the correlation-data storage processing goes on to a step S37.

At the step S37, the control section 23 compares the correlation value P computed at the step S35 with the maximum correlation value max set at the step S31 in order to produce a result of determination as to whether or not the correlation value P is greater than the maximum correlation value max (that is, P>max).

If the determination result produced by the control section 23 at the step S37 indicates that the correlation value P is not greater than the maximum correlation value max, that is, if the result of the determination indicates that the correlation value P is smaller than the maximum correlation value max, the flow of the correlation-data storage processing goes back to the step S32 to repeat the processes described above, starting with the process of the step S32.

If the determination result produced by the control section 23 at the step S37 indicates that the correlation value P is greater than the maximum correlation value max, on the other hand, the flow of the correlation-data storage processing goes back to the step S31 to repeat the processes described above, starting with the process of the step S31. It is to be noted, however, that at the step S31 carried out this time, the maximum correlation value max is updated to the correlation value P determined at the step S37 to be greater than the current maximum correlation value max and the stored-data count num is again reset at 0.

As described above, correlation values P are stored in the memory 24 by carrying out the correlation-data storage processing repeatedly. As the determination result produced by the control section 23 at the step S34 indicates that the stored-data count num is greater than half the memory size set at N storage locations as the size of the memory 24, the correlation-data storage processing is ended.

As described above, after the correlation value P determined to be equal to the maximum correlation value max has been stored in the memory 24, N/2 correlation values P forming the second half part of the correlation data are stored in the memory 24. As described above, the integer N representing the storage capacity of the memory 24 is the number of storage locations in the memory 24. In addition, since correlation values P are stored in the memory 24 by adoption of the ring-buffer method, before the correlation value P determined to be equal to the maximum correlation value max is stored in the memory 24, N/2 correlation values P forming the first half part of the correlation data have been stored in the memory 24. That is to say, correlation values P forming correlation data are stored in the memory 24 at N storage locations centered at an address used for storing the correlation value P determined to be equal to the maximum correlation value max.

In general, the correlation value P representing a correlation with the synchronization signal included in the principal wave is the largest correlation value P among the correlation values P forming correlation data stored in the memory 24. The largest correlation value P among the correlation values P forming correlation data stored in the memory 24 is referred to as the maximum correlation value max. Thus, the signal receiving apparatus 21 is capable of storing the correlation values P forming correlation data in the memory 24 at N storage locations centered at an address used for storing the correlation value P representing a correlation with the synchronization signal included in the principal wave. In other words, the signal receiving apparatus 21 is capable of storing the N/2 correlation values P on the upstream side of the correlation value P representing a correlation with the synchronization signal included in the principal wave and the N/2 correlation values P on the downstream side of the correlation value P representing a correlation with the synchronization signal included in the principal wave in the memory 24.

As described above, the signal receiving apparatus 21 is capable of storing the correlation values P forming correlation data in the memory 24 at N storage locations centered at an address used for storing the correlation value P representing a correlation with the synchronization signal included in the principal wave. Thus, the CPU 25 is capable of estimating a proper channel profile from correlation data acquired for a plurality of frames. The proper channel profile estimated in this way is a channel profile estimated from correlation data including the correlation values P of a principal wave, a pre-echo and a post-echo.

Figure 2A:
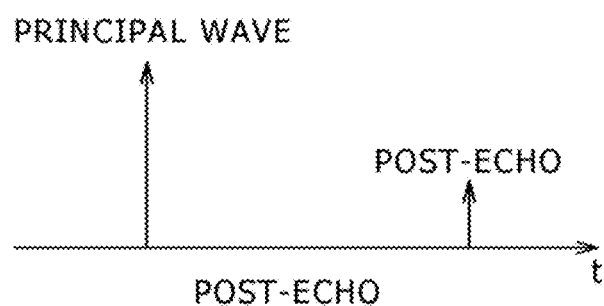
FIG. 2A is a diagram showing a principal wave and a post-echo.
Figure 2B:
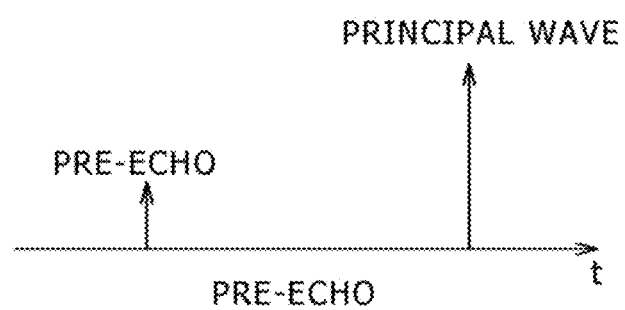
FIG. 2B is a diagram showing a principal wave and a pre-echo.
Figure 3:
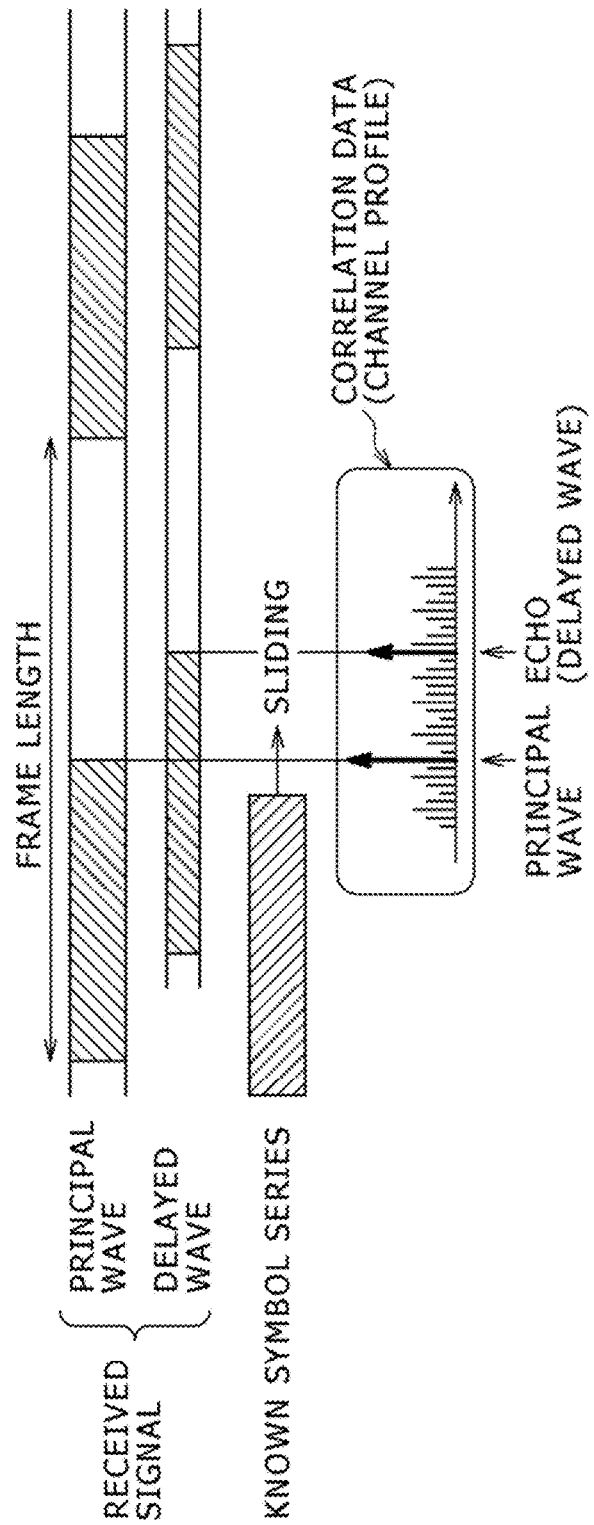
FIG. 3 is an explanatory diagram to be referred to in description of a process to estimate a channel profile.
Figure 4:
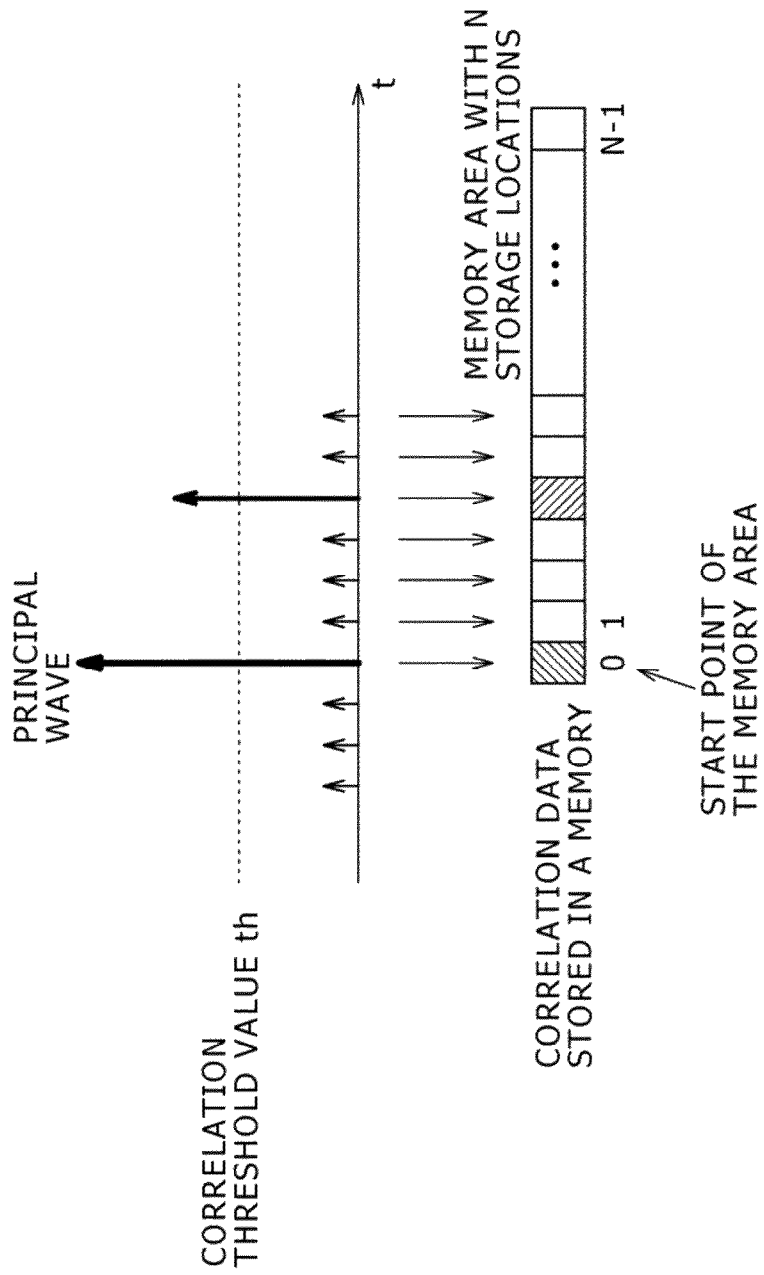
FIG. 4 is a diagram showing a storage image of correlation values stored in a memory as correlation data to be used for estimating a channel profile.
Figure 5:
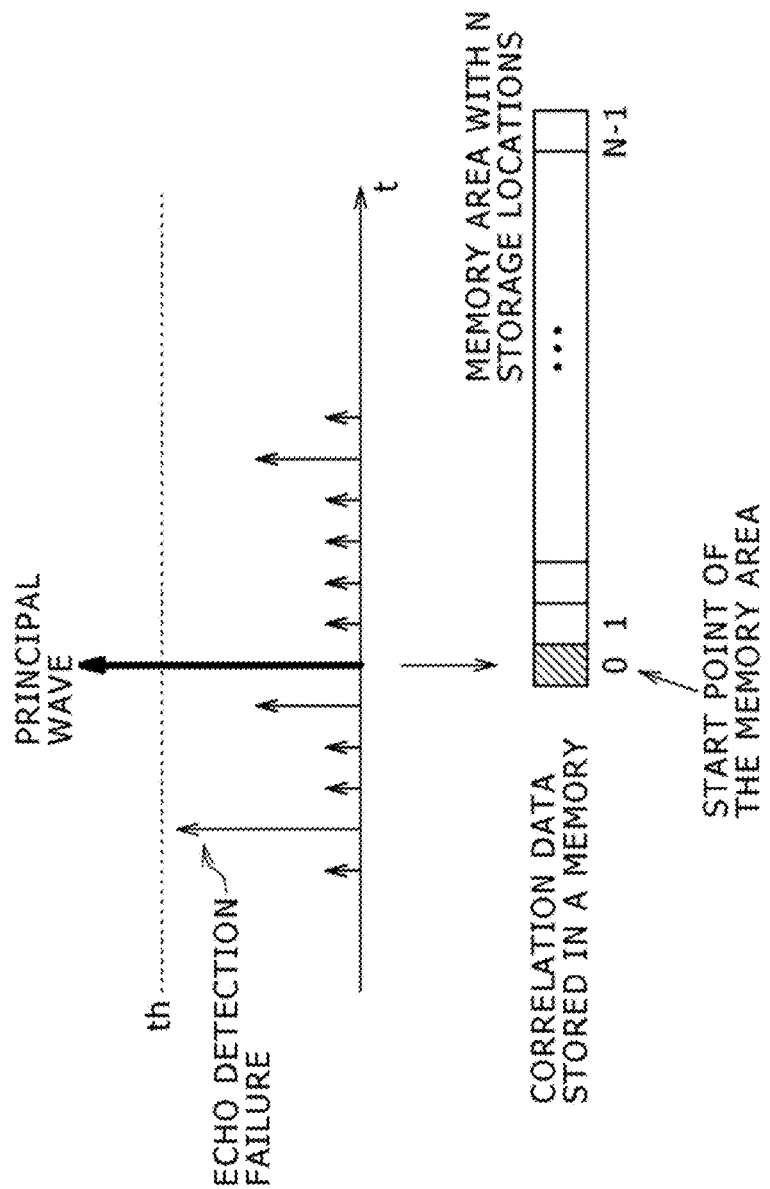
FIG. 5 is a diagram showing a storage image of correlation values stored in a memory as correlation data to be used for estimating a channel profile.

That is to day, if the operation to store correlation data starts with an operation to store the correlation value P of a principal wave as explained earlier by referring to the diagram of FIG. 5 for example, the correlation data will not include the correlation value P of a pre-echo. Since the signal receiving apparatus 21 stores the correlation values P forming correlation data in the memory 24 at N storage locations centered at an address used for storing the correlation value P determined to be equal to the maximum correlation value max as described above, the correlation value P of a pre-echo is included in the stored correlation data with a high degree of reliability.

Figure 6:
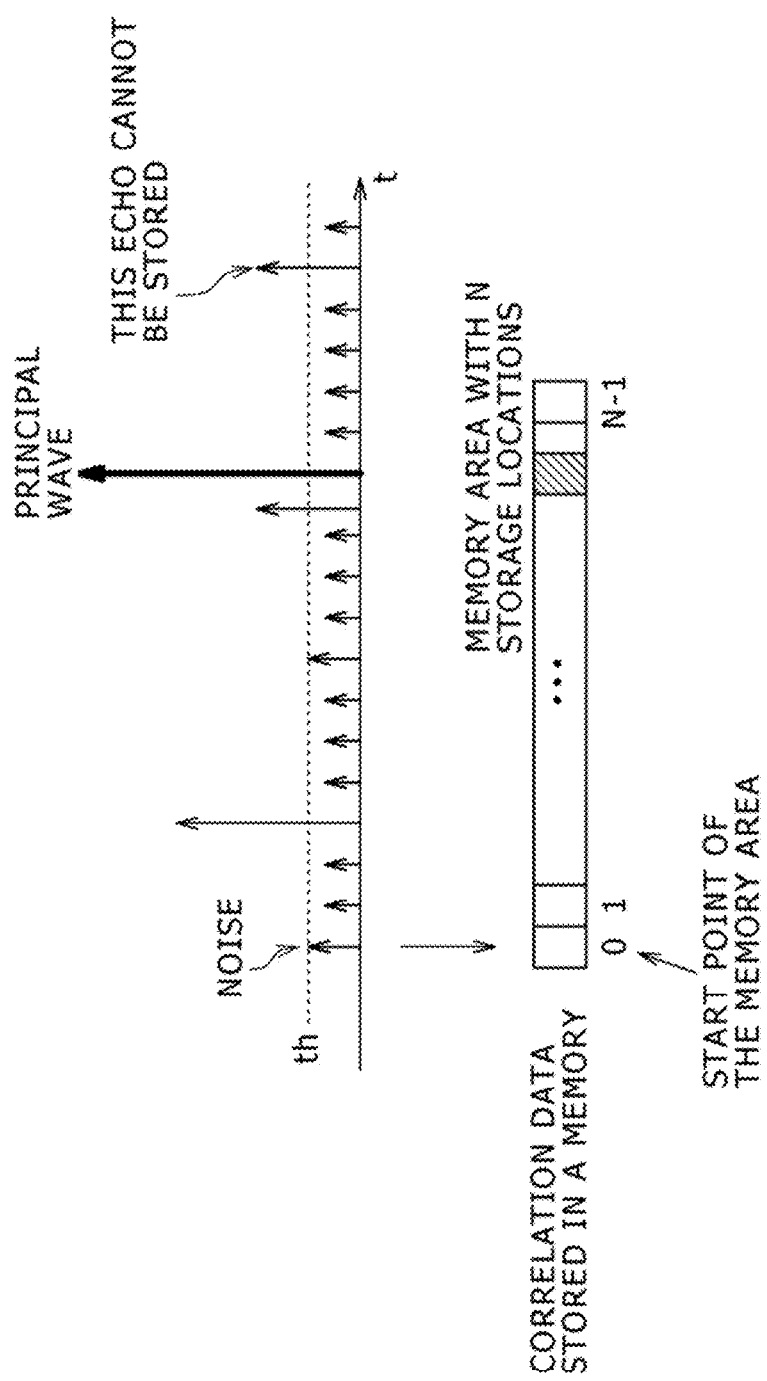
FIG. 6 is a diagram showing a storage image of correlation values stored in a memory as correlation data to be used for estimating a channel profile.

In addition, as explained earlier by referring to the diagram of FIG. 6, if the correlation threshold value th is set at too a low level, the correlation value P of a post echo cannot be stored in the memory 24 in some cases. On the basis of a result of comparing a correlation value P with the maximum correlation value max, the signal receiving apparatus 21 is capable of storing the correlation values P forming correlation data in the memory 24 at N storage locations centered at an address used for storing the correlation value P determined to be equal to the maximum correlation value max as described above by referring the flowchart shown in FIG. 12. Thus, it is possible to prevent the operation to store correlation values P from being started by a noise used as a trigger. As a result, the correlation value P of the post-echo is included in the stored correlation data with a high degree of reliability.

In the embodiment described above, the signal receiving apparatus 21 is capable of storing the correlation values P forming correlation data in the memory 24 at N storage locations centered at an address used for storing the correlation value P representing a correlation with the synchronization signal included in the principal wave. It is to be noted, however, that the address used for storing the correlation value P representing a correlation with the synchronization signal included in the principal wave can also be an address lagging behind the start address of the memory 24 used for storing the correlation data by a typical distance of N/3 or 2N/3 storage locations. That is to say, the number of correlation values P to be stored in the memory 24 to form the later part of the correlation data after the correlation value P determined to be equal to the maximum correlation value max has been stored in the memory 24 does not have to be N/2. Instead, the number of correlation values P to be stored in the memory 24 to form the later part of the correlation data after the correlation value P determined to be equal to the maximum correlation value max has been stored in the memory 24 can be a typical value of 2N/3 or N/3. It is to be noted that the number of correlation values P stored in the memory 24 is the number of symbols stored in the memory 24.

In addition, by setting the integer N representing the size of the memory 24 at a large value, the signal receiving apparatus 21 is capable of coping with echos in a broader range.

The synchronization signal is inserted into every frame in a signal transmitted through a transmission line by a signal transmitting apparatus shown in none of the diagrams of the figures as a frame having a frame length determined in advance and the signal receiving apparatus 21 acquires correlation data for a plurality of such frames. Then, the signal receiving apparatus 21 estimates a channel profile representing the characteristic of the transmission line by taking an average of pieces of such correlation data.

Figure 13:
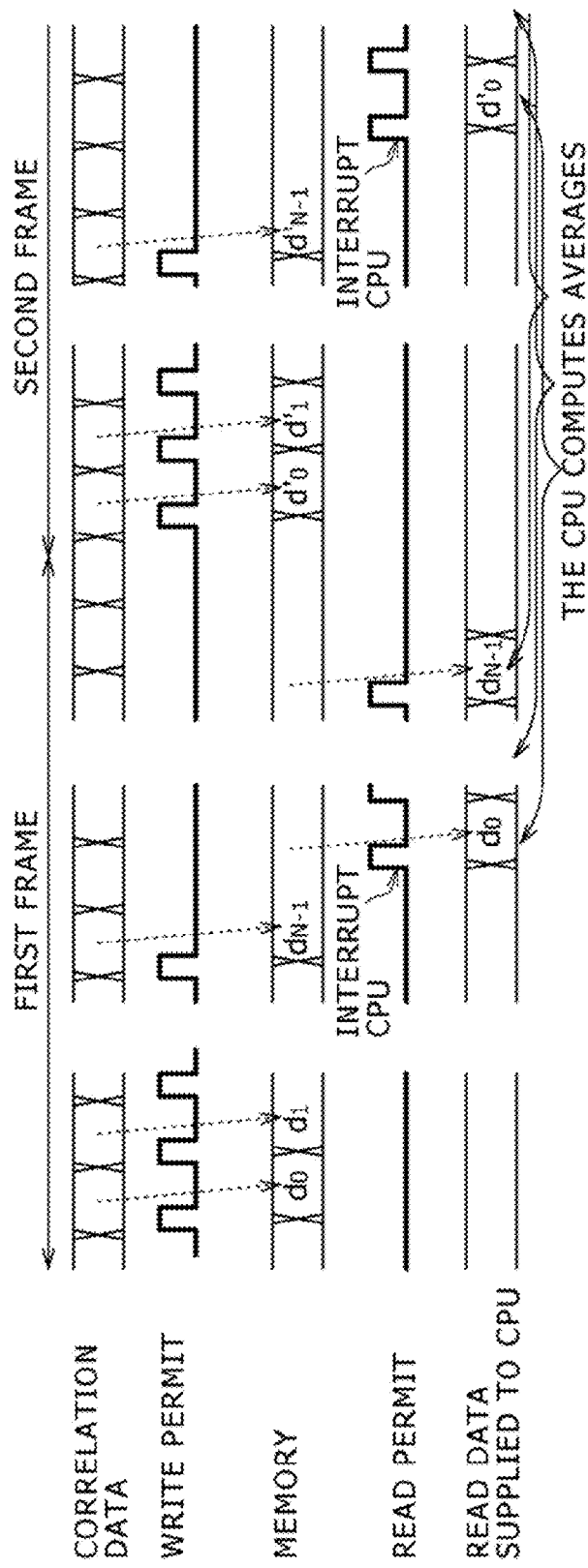
FIG. 13 is a timing diagram showing the timing charts of signals which appear in the signal receiving apparatus.

By referring to a diagram of FIG. 13, the following description explains processing to write correlation data into the memory 24 and processing to read out correlation data from the memory 24 a plurality of times in accordance with interrupts made by the CPU 25. In the case of the typical example explained by referring to the diagram of FIG. 13, the processing to write correlation data into the memory 24 and the processing to read out correlation data into the memory 24 are carried out 2 times for 2 successive frames respectively. In the following description, the 2 consecutive frames are referred to as first and second frames.

FIG. 13 is a timing diagram showing the timing charts of signals which appear in the signal receiving apparatus 21.

The first (or top) timing chart of the timing diagram of FIG. 13 is the timing chart of a correlation value P computed by the correlation-value computation section 22. The second timing chart is the timing chart of a write-permit signal for allowing the control section 23 to store the correlation value P in the memory 24. The third timing chart is the timing chart of an operation to store the correlation value P of the correlation data into the memory 24. In the timing diagram, the correlation values P forming the correlation data are denoted by symbols $d_0$ to $d_{N-1}$. The fourth timing chart is the timing chart of a read-permit signal for allowing the CPU 25 to read out a correlation value P from the memory 24. The fifth (or bottom) timing chart is the timing chart of an operation to read out the correlation value P of the correlation data from the memory 24. As described above, the correlation values P forming the correlation data are denoted by symbols $d_0$ to $d_{N-1}$.

First of all, for the first frame, by carrying out the threshold-value comparison processing represented by the flowchart shown in FIG. 11 and the correlation-data storage processing represented by the flowchart shown in FIG. 12, the control section 23 stores the correlation values P forming correlation data in the memory 24 at N storage locations centered at an address used for storing the correlation value P. After the control section 23 completes the correlation-data storage processing to store the correlation values P, the control section 23 issues a request for an interrupt to the CPU 25. In response to the request for an interrupt, the CPU 25 makes an interrupt. In this case, the interrupt made by the CPU 25 is an interrupt to read out a correlation value P from the memory 24.

As described above, when the control section 23 issues a request for an interrupt to the CPU 25, the CPU 25 makes an interrupt in response to the request for an interrupt. Interrupted by the CPU 25, the control section 23 supplies the read-permit signal and a read address to the memory 24 in order to enable the memory 24 to output the correlation data denoted by symbols $d_0$ to $d_{N-1}$, to the CPU 25 as read data.

Thereafter, the control section 23 starts the write processing for the second frame in accordance with a self-running counter embedded in the control section 23. The control section 23 supplies the write-permit signal, a write address and a correlation value P computed by the correlation-value computation section 22 to the memory 24 in order to enable the memory 24 to store the correlation value P at the write address as write data. At a point of time the control section 23 completes the correlation-data storage processing to store the correlation values P, the control section 23 issues a request for an interrupt to the CPU 25. In this way, the control section 23 carries out an operation to write correlation data into the memory 24 and an operation to drive the CPU 25 to read out correlation data from the memory 24 for every frame of the received signal.

Then, the CPU 25 computes an average of correlation values P each included in correlation data read out from the memory 24 for one of a plurality of frames in order to estimate a channel profile. In the case of the typical frames shown in the timing diagram of FIG. 13 for example, the CPU 25 computes the average of the correlation value denoted by symbol $d_0$ as a correlation value P computed for the first frame and the correlation value denoted by symbol $d'_0$ as a correlation value P computed for the second frame. Then, the CPU 25 computes the average of the correlation value denoted by symbol $d_1$ as a correlation value P computed for the first frame and the correlation value denoted by symbol $d'_1$ as a correlation value P computed for the second frame. This operation to compute an average value is carried out for every couple of correlation values P computed for the first and second frames respectively till the execution of the operation to compute the average of the correlation value denoted by symbol $d_{N-1}$ as a correlation value P computed for the first frame and the correlation value denoted by symbol $d'_{N-1}$ as a correlation value P computed for the second frame in order to estimate a channel profile representing the averages computed for the correlation values $d_0$ to $d_{N-1}$ and the correlation values $d'_0$ to $d'_{N-1}$.

By computing averages for a plurality of pieces of correlation data as described above, the effects of noises can be reduced. As a result, a more accurate channel profile can be estimated.

It is to be noted that the embodiments can be applied to not only a signal receiving apparatus for receiving digital broadcasts, but also other apparatus such as a relay apparatus installed at a relay station to serve as an apparatus for relaying digital broadcasts and a radio-communication apparatus such as a portable terminal for carrying out radio communications.

The series of processes described previously can be carried out by hardware and/or execution of software. If the series of processes described above is carried out by execution of software, a variety of programs composing the software can be installed into a computer embedded in dedicated hardware, a general-purpose personal computer or the like from typically a network or a removable recording medium. In this case, the computer or the personal computer serves as the signal receiving apparatus 21 described above. A general-purpose personal computer is a personal computer, which can be made capable of carrying out a variety of functions by installing a variety of programs into the personal computer.

Figure 14:
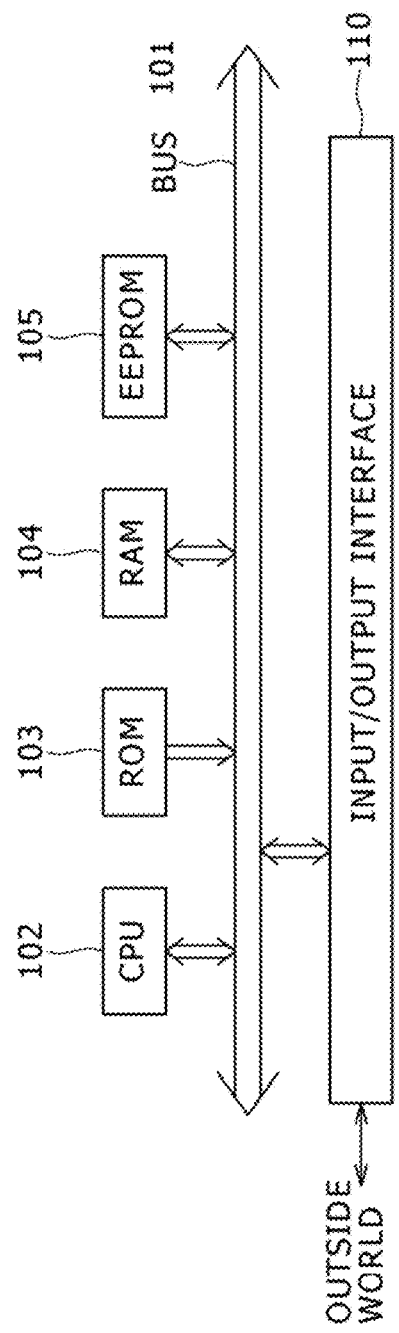
FIG. 14 is a block diagram showing a typical configuration of hardware of a computer serving as the signal receiving apparatus provided by the embodiments.

FIG. 14 is a block diagram showing a typical configuration of hardware of a microcomputer which serves as the computer (or the personal computer) for executing the programs in order to carry out the series of processes described above.

The programs can be stored in advance in an EEPROM (Electrically Erasable Programmable Read-only Memory) 105 or a ROM 103. Each of the EEPROM 105 and the ROM 103 is a storage medium embedded in the microcomputer.

As an alternative, the aforementioned removable recording medium for temporarily or permanently storing (or recording) the programs to be installed into the microcomputer shown in the diagram of FIG. 14 as programs to be executed by the microcomputer is provided to the user separately from the main unit of the microcomputer. Examples of the removable recording mediums also each referred to as a package medium include a magnetic disk such as a flexible disk, an optical disk such as a CD-ROM (Compact Disk-Read Only Memory) or a DVD (Digital Versatile Disk), an MO (Magneto-Optical) disk such as an MD (Mini Disk) as well as a semiconductor memory.

Instead of installing the programs into the microcomputer from the removable recording mediums, the programs can also be downloaded from a program provider external to the microcomputer by way of a radio and/or wire network. In the microcomputer, the programs are received by an input/output interface 110 and installed in the EEPROM 105 embedded in the microcomputer.

As shown in the block diagram of FIG. 14, the microcomputer employs a CPU (Central Processing Unit) 102, a ROM (Read Only Memory) 103, a RAM (Random Access Memory) 104, the EEPROM 105 and the input/output interface 110 which are connected to each other by a bus 101. In place of the CPU 102, a DSP (Digital Signal Processor) can also be used.

The CPU 102 is a section for executing the programs after the programs have been loaded into the RAM 104. Each of the programs loaded into the RAM 104 can be a program stored in advance in the ROM 103 or a program, which has been installed in the EEPROM 105 from an aforementioned removable recording medium or from the program provider cited above. The CPU 102 executes the programs in order to carry out each series of processes represented by one of the flowcharts explained previously and/or processes of blocks shown in the block diagram of FIG. 7. It is to be noted that the CPU 102 exchanges data with apparatus external to the microcomputer by way of the input/output interface 110.

It is also to be noted that each program to be executed by the microcomputer can be a program executed for carrying out processes along the time axis in an order explained in this specification or a program executed for carrying out processes concurrently or with required timings such as an invocation timing.

It is also worth noting that, in this specification, steps of each flowchart described above can be carried out to perform processes not only in a pre-prescribed order along the time axis, but also concurrently or individually. Typical examples of the processes carried out concurrently or individually are parallel processes and object-oriented processes. In addition, a program can be executed by not only 1 CPU, but also a plurality of CPUs in the so-called distributed processing.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A signal receiving apparatus for receiving signals, said signal receiving apparatus comprising:
   a correlation-value computation section configured to sequentially compute a correlation value representing a correlation between a received signal and a series of known symbols while sliding said series of known symbols for every symbol included in said received signal;
   a maximum-value detection section configured to detect a largest correlation value among said correlation values computed by said correlation-value computation section for one frame of said received signal by:
      comparing each of said correlation values computed by said correlation-value computation section with a threshold value determined in advance in order to detect a correlation value greater than said threshold value,
      setting a maximum correlation value at a correlation value detected as a correlation value greater than said threshold value,
      producing a result of a determination as to whether or not a correlation value, which is computed after a correlation value greater than said threshold value is detected, is greater than said maximum correlation value,
      updating said maximum correlation value with a specific correlation value determined to be greater than said maximum correlation value if said determination result indicates that said specific correlation value is greater than said maximum correlation value; and
   a correlation-value storage section configured to store each of the correlation values at one of a predetermined number of storage locations, before and after said largest correlation value is detected by said maximum-value detection section, by adoption of a ring-buffer method until a correlation value that is greater than said threshold value is detected.

2. The signal receiving apparatus according to claim 1 wherein:
   said correlation-value storage section is used for storing as many correlation values for each of frames of said received signal as the predetermined number of storage locations; and
   a channel-profile estimation section further included in said signal receiving apparatus is used for estimating a channel profile representing characteristics of a transmission line used for transmitting said signal to said signal receiving apparatus on the basis of every average of corresponding correlation values each computed for one of a plurality of said frames.

3. A signal receiving method for receiving a signal, said signal receiving method comprising:
   sequentially computing a correlation value representing a correlation between a received signal and a series of known symbols while sliding said series of known symbols for every symbol included in said received signal;
   detecting a largest correlation value among said correlation values computed at said correlation-value computation step for one frame of said received signal by:
      comparing each of said correlation values computed at said correlation-value computation step with a threshold value determined in advance in order to detect a correlation value greater than said threshold value,
      setting a maximum correlation value at a correlation value detected as a correlation value greater than said threshold value,
      producing a result of a determination as to whether or not a correlation value, which is computed after a correlation value greater than said threshold value is detected, is greater than said maximum correlation value,
      updating said maximum correlation value with a specific correlation value determined to be greater than said maximum correlation value if said determination result indicates that said specific correlation value is greater than said maximum correlation value; and
   storing each of said correlation values computed at said correlation-value computation step at one of a predetermined number of storage locations, before and after said largest correlation value is detected at said maximum-value detection step.

4. A non-transitory computer-readable medium storing executable instructions that when executed by a processor embedded in a signal receiving apparatus for receiving signals perform steps comprising:
   computing a correlation value representing a correlation between a received signal and a series of known symbols while sliding said series of known symbols for every symbol included in said received signal;
   detecting a largest correlation value among said correlation values computed in said correlation-value computation process for one frame of said received signal by:
      comparing each of said correlation values computed in said correlation-value computation process with a threshold value determined in advance in order to detect a correlation value greater than said threshold value, setting a maximum correlation value at a correlation value detected as a correlation value greater than said threshold value, producing a result of a determination as to whether or not a correlation value, which is computed after a correlation value greater than said threshold value is detected, is greater than said maximum correlation value, updating said maximum correlation value with a specific correlation value determined to be greater than said maximum correlation value if said determination result indicates that said specific correlation value is greater than said maximum correlation value; and storing each of said correlation values computed in said correlation-value computation process at one of a predetermined number of storage locations, before and after said largest correlation value is detected in said maximum-value detection process.

5. A signal receiving apparatus for receiving signals, said signal receiving apparatus comprising:

correlation-value computation means for sequentially computing a correlation value representing a correlation between a received signal and a series of known symbols while sliding said series of known symbols for every symbol included in said received signal;

maximum-value detection means for detecting a largest correlation value among said correlation values computed by said correlation-value computation means for one frame of said received signal by:

comparing each of said correlation values computed by said correlation-value computation means with a threshold value determined in advance in order to detect a correlation value greater than said threshold value, setting a maximum correlation value at a correlation value detected as a correlation value greater than said threshold value, producing a result of a determination as to whether or not a correlation value, which is computed after a correlation value greater than said threshold value is detected, is greater than said maximum correlation value, updating said maximum correlation value with a specific correlation value determined to be greater than said maximum correlation value if said determination result indicates that said specific correlation value is greater than said maximum correlation value; and correlation-value storage means for storing each of the correlation values at one of a predetermined number of storage locations, before and after said largest correlation value is detected by said maximum-value detection means.

\* \* \* \* \*